United States Patent
Jeong

(10) Patent No.: US 10,157,010 B2
(45) Date of Patent: Dec. 18, 2018

(54) APPLICATION PROCESSOR AND A MOBILE APPARATUS HAVING A PLURALITY OF ADDRESS MAPPING FORMATS AND METHOD OF ACCESSING DATA INCLUDING THE SAME

(71) Applicant: SAMSUNG ELECTRONICS CO., LTD., Suwon-si, Gyeonggi-do (KR)

(72) Inventor: Kyungah Jeong, Seoul (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 229 days.

(21) Appl. No.: 15/040,296

(22) Filed: Feb. 10, 2016

(65) Prior Publication Data
US 2016/0350212 A1 Dec. 1, 2016

(30) Foreign Application Priority Data
Jun. 1, 2015 (KR) .................. 10-2015-0077402

(51) Int. Cl.
| | | |
|---|---|---|
| G06F 12/00 | (2006.01) | |
| G06F 9/26 | (2006.01) | |
| G06F 9/34 | (2018.01) | |
| G06F 3/06 | (2006.01) | |
| G06F 12/02 | (2006.01) | |
| G06T 1/60 | (2006.01) | |

(Continued)

(52) U.S. Cl.
CPC ............ *G06F 3/0635* (2013.01); *G06F 3/061* (2013.01); *G06F 3/0604* (2013.01); *G06F 3/0638* (2013.01); *G06F 12/0207* (2013.01); *G06F 12/0292* (2013.01); *G06T 1/60* (2013.01); *G06F 3/0613* (2013.01); *G06F 3/0673* (2013.01); *G06F 12/10* (2013.01); *G06F 12/1072* (2013.01); *G06F 2212/1056* (2013.01); *G06F 2212/401* (2013.01)

(58) Field of Classification Search
CPC ...... G06F 3/0673; G06F 3/064; G06F 3/0604; G06F 3/061; G06F 3/0638; G06F 3/0635; G06F 12/0207; G06F 12/0292; G06F 12/1072; G06F 2212/401; G06F 2212/1056; G06F 2212/161; G06F 3/0613; G06F 12/10; G06T 1/60
USPC .................. 711/154, 200, 206, 209, 211, 217
See application file for complete search history.

(56) References Cited

U.S. PATENT DOCUMENTS 5,696,927 A * 12/1997 MacDonald .......... G06F 12/023
710/68
2012/0075318 A1 3/2012 Ikeno et al.
(Continued)

FOREIGN PATENT DOCUMENTS

JP 2008263646 10/2008

*Primary Examiner* — Shane Woolwine
(74) *Attorney, Agent, or Firm* — F. Chau & Associates, LLC

(57) ABSTRACT

An application processor and a mobile apparatus are provided. The application processor includes a memory device configured to store data based upon a plurality of address mapping formats, an address mapping table configured to store information on one of the address mapping formats to access the data, a system bus configured to generate a second address based upon a first address to access the data and the address mapping table and a data processing device configured to receive the data according to the second address through the system bus.

16 Claims, 10 Drawing Sheets

(51) Int. Cl.
  *G06F 12/10* (2016.01)
  *G06F 12/1072* (2016.01)

(56) References Cited

U.S. PATENT DOCUMENTS

| | | | |
|---|---|---|---|
| 2013/0286028 A1* | 10/2013 | Hur | G09G 5/39 |
| | | | 345/540 |
| 2014/0177729 A1* | 6/2014 | Liu | H04N 19/40 |
| | | | 375/240.24 |
| 2014/0226911 A1 | 8/2014 | Kaya et al. | |
| 2015/0039777 A1 | 2/2015 | Glasser et al. | |

* cited by examiner

FIG. 2A

| | | | | | | | | | | | | | | | | |
|---|---|---|---|---|---|---|---|---|---|---|---|---|---|---|---|---|
| H1 | P1 | P2 | P3 | P4 | P5 | P6 | P7 | P8 | P9 | P10 | P11 | P12 | P13 | P14 | P15 | P16 |
| H2 | P17 | P18 | P19 | P20 | P21 | P22 | P23 | P24 | P25 | P26 | P27 | P28 | P29 | P30 | P31 | P32 |
| H3 | P33 | P34 | P35 | P36 | P37 | P38 | P39 | P40 | P41 | P42 | P43 | P44 | P45 | P46 | P47 | P48 |
| H4 | P49 | P50 | P51 | P52 | P53 | P54 | P55 | P56 | P57 | P58 | P59 | P60 | P61 | P62 | P63 | P64 |

AMT3

| LA1 | PA1 | M1 (Linear Map) |
| --- | --- | --- |
| LA2 | PA2 | M2 (Tiled Map) |
| LA3 | PA3 | M3 (Compression) |
| LA4 | PA4 | M4 (Linear Map) |

APPLICATION PROCESSOR AND A MOBILE APPARATUS HAVING A PLURALITY OF ADDRESS MAPPING FORMATS AND METHOD OF ACCESSING DATA INCLUDING THE SAME

CROSS-REFERENCE TO RELATED APPLICATION

The present application claims under 35 U.S.C. § 119 priority to and the benefit of Korean Patent Application No. 10-2015-0077402 filed on Jun. 1, 2015, the entire contents of which are incorporated by reference herein.

BACKGROUND

1. Technical Field

The inventive concepts described herein relate to application processors, and more particularly, to an application processor capable of accessing data stored in a memory device regardless of an address mapping format, and a mobile apparatus having the same.

2. Description of Related Art

Methods of storing data in a memory device may include a variety of address mapping approaches depending on the purpose thereof. In particular, in the case of image data, there are various memory maps that depend upon the purpose of a process, as well as a sequential address mapping format (i.e., a linear map) which is generally and frequently used.

For example, a tiled map based upon various methods may be used. When processing an image of a large size according to a complex scenario, a mobile apparatus may use a compressed address mapping format for reducing a bandwidth to reduce a load of a system bus.

However, when software of the mobile apparatus processes data according to data address mapping formats, problems may occur. For example, when accessing image data of a tiled map or compressed image data, a central processing unit may need additional processing to access the image data. For this reason, the software may have limitations and may require complex programs.

SUMMARY

Exemplary embodiments of the inventive concept provide an application processor capable of accessing data stored in a memory device regardless of address mapping format.

Other exemplary embodiments of the inventive concept provide a mobile apparatus having the application processor.

Still other exemplary embodiments of the inventive concept provide an application processor including a memory controller capable of accessing data stored in a memory device regardless of address mapping format.

The technical objectives of the inventive concept are not limited to the above disclosure, and other objectives may become apparent to those of ordinary skill in the art based upon the following descriptions.

In accordance with one aspect of the inventive concept, an application processor includes a memory device configured to store data based upon a plurality of address mapping formats, an address mapping table configured to store information on one of the address mapping formats to access the data, a system bus configured to generate a second address based upon a first address to access the data and the address mapping table and a data processing device configured to receive the data according to the second address through the system bus.

In accordance with another aspect of the inventive concept, an application processor includes a memory device configured to store data based upon an address mapping format, a memory controller configured to generate a second address based upon a first address to access the data and the address mapping table, an address mapping table configured to store information on the address mapping format of the data and a data processing device configured to receive the data according to the second address.

In accordance with still another aspect of the inventive concept, a mobile apparatus includes a memory device configured to store data based upon method plurality of address mapping formats, and an application processor configured to receive the data from the memory device, wherein the application processor includes an address mapping table configured to store information in the address mapping format of the data, a converter configured to generate a second address based upon a first address to access the data and the address mapping table, a system bus configured to transmit the second address and transceiver the data according to the second address and a data processing device configured to receive the data through the system bus.

In accordance with still another aspect of the inventive concept, a method of accessing data having a plurality of address mapping formats includes receiving a first address to access the data stored according to a plurality of address mapping formats from a master device, generating a second address based upon the first address and one of the address mapping formats associated with the first address, transmitting the second address to access the data to a slave device. The method of accessing data further includes determining whether the first address is associated with a compression map. The method of accessing data further includes decompressing the data when the address map associated with the first address is compression map. Here, the data is stored in a memory device in an application processor or outside of the application processor.

BRIEF DESCRIPTION OF THE DRAWINGS

The foregoing and other features and advantages of the inventive concepts will be apparent from the more particular description of exemplary embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings:

FIG. 2A is a conceptual diagram illustrating pixels for describing a linear map;

FIG. 4 is a table illustrating an address mapping table shown in FIGS. 3A and 3B;

DETAILED DESCRIPTION OF THE EMBODIMENTS

Figure 1:
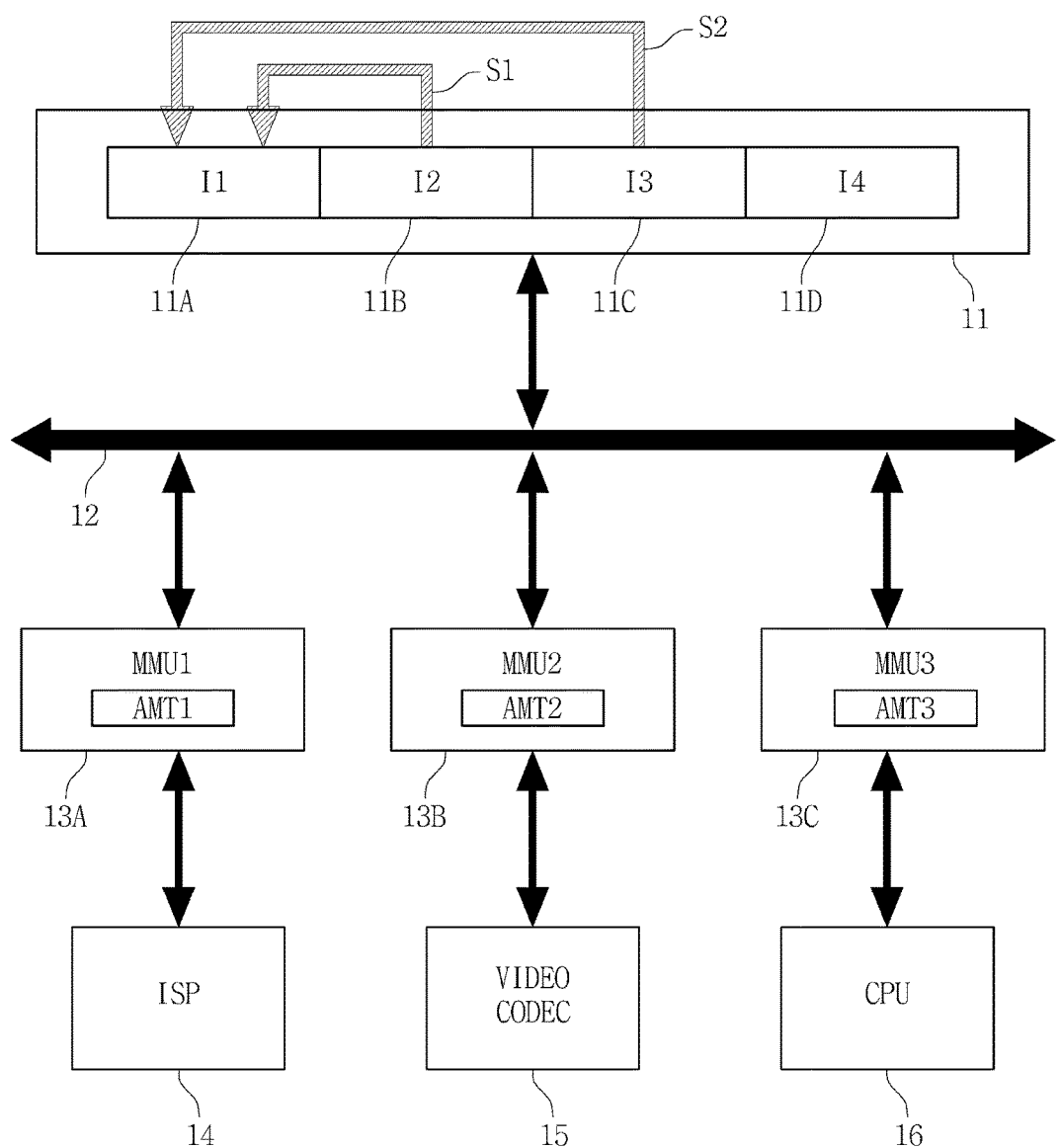
FIG. 1 is a block diagram illustrating an application processor (AP) according to a related art.

Exemplary embodiments of the present invention are described below in sufficient detail to enable those of ordinary skill in the art to embody and practice the present invention. It is important to understand that the present invention may be embodied in many alternate forms and should not be construed as limited to the exemplary embodiments set forth herein.

While the invention is susceptible to various modifications and alternative forms, specific exemplary embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," "A," "B," etc. may be used herein in reference to elements of the invention, such elements should not be construed as being limited by these terms. For example, a first element could be termed a second element, and a second element could be termed a first element, without departing from the scope of the present invention. Herein, the term "and/or" includes any and all combinations of one or more items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe exemplary embodiments of the invention is not intended to limit the scope of the invention. The articles "a," "an," and "the" are singular in that they have a single item, however the use of the singular form in the present document should not preclude the presence of more than one item. In other words, elements of the invention referred to as in singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

When it is possible to implement any exemplary embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Exemplary embodiments of the present inventive concept will now be described below with reference to the attached drawings.

FIG. 1 is a block diagram illustrating an application processor (AP) according to related art. Referring to FIG. 1, AP 10 according to the related art may include a memory device 11, a system bus 12, a first memory management unit (MMU1) 13A, a second memory management unit (MMU2) 13B, a third memory management unit (MMU3) 13C, an image signal processor (ISP) 14, a video codec 15, and a central processing unit (CPU) 16.

The memory device 11 may store data in accordance with multiple address mapping formats. The AP 10 may include at least one address mapping table corresponding to an address mapping format and/or a stored data, for example, a compressed data. The AP 10 may process a plurality of address mapping formats. For example, the AP 10 may include at least two of a linear map, a tiled map and a compression map. For example, the memory device 11 may store data based upon the linear map or tiled map. Moreover, the memory device 11 may store compressed data.

In an exemplary embodiment, the memory device 11 may be a cache memory device. Moreover, the memory device 11 may be a main memory device such as a Dynamic Random Access Memory (DRAM) located outside the AP 10.

The memory device 11 may store first image data I1 in a first area 11A according to a linear map. Moreover, the memory device 11 may store second image data I2 in a second area 11B according to a tiled map. Moreover, the memory device 11 may store the compressed third image data I3 in a third area 11C. Moreover, the memory device 11 may store fourth image data I4 in a fourth area 11D according to the linear map.

The system bus 12 may connect the memory device 11 to the ISP 14 through the MMU1 13A. The system bus 12 may connect the memory device 11 to the video codec 15 through the MMU2 13B. The system bus 12 may connect the memory device 11 to the CPU 16 through the MMU3 13C.

Each of the MMU1 13A, MMU2 13B and MMU313C may include an address mapping table for converting a logical address into a physical address.

For example, the MMU1 13A may include a first address mapping table AMT1 for the ISP 14. The MMU213B may include a second address mapping table AMT2 for the video codec 15. The MMU3 13C may include a third address mapping table AMT3 for the CPU 16.

The ISP 14 may access the memory device 11 based upon the first address mapping table AMT1. The video codec 15 may access the memory device 11 based upon the second address mapping table AMT2. The CPU 16 may access the memory device 11 based upon the third address mapping table AMT3.

For example, when the CPU 16 reads the memory device 11, the CPU 16 may transmit a logical address to the MMU3 13C. The MMU3 13C may convert a logical address into a physical address.

The MMU3 13C may transmit the physical address to the memory device 11 through the system bus 12. The memory device 11 may transmit data corresponding to the physical address to the CPU 16 through the system bus 12.

The ISP 14 may access the memory device 11 through the system bus 12. For example, the ISP 14 may perform image-processing with respect to the first to fourth image data I1 to I4 in the memory device 11 to remove a noise and the like.

The video codec 15 may access the memory device 11 through the system bus 12. For example, the video codec 15 may replay one of the first to fourth image data I1, I2, I3, I4 stored in the memory device 11.

Likewise, the CPU 16 may access the memory device 11 through the system bus 12. However, the CPU 16 may operate an address with respect to each pixel to directly access data stored according to the tiled map. Accordingly, the AP 10 may have limitations.

To solve this problem, when the CPU 16 accesses the second image data I2 stored according to the tiled map, the CPU 16 may convert the second image data I2 stored according to the tiled map into the second image data I2 based upon the linear map. Moreover, the CPU 16 may store the second image data I2 in the first area 11A according to the linear map (S1). Then, the CPU 16 may access the second image data I2 stored according to the linear map.

Alternatively, the CPU 16 may allocate a new space in the memory device 11 and perform a process for storing the second image data I2 in the new space according to the linear map again.

Likewise, when the CPU 16 accesses the third image data I3 which is compressed, the CPU 16 may decompress the third image data I3 and store the decompressed third image data I3 in the first area 11A (S2). Then, the CPU 16 may access the third image data I3.

Alternately, the CPU 16 may allocate a new space in the memory device 11 and store the decompressed third image data I3 in the new space.

Therefore, because the AP 10 according to the related art stores image data again, an occupied memory space in the memory device 11 may be expanded and a bandwidth for a data transmission may be reduced.

FIG. 2A is a conceptual diagram illustrating pixels for describing a linear map. Referring to FIGS. 1 and 2A, a first image 21 may be illustrated in FIGS. 1 and 2A. The first image 21 may include a plurality of pixels P1, P2, . . . P64. For example, when the first image 21 has a resolution of 800×600, the first image 21 may have 480,000 pixels.

The first image 21 may include a plurality of horizontal lines. For example, the first image 21 may include a first to fourth horizontal lines H1 to H4. The first horizontal line H1 may have first to sixteenth pixels P1, P2, . . . P16. The second horizontal line H2 may have seventeenth to thirty-second pixels P17, P18, . . . P32. The third horizontal line H3 may have thirty-third to forty-eighth pixels P33, P34, . . . P48. The fourth horizontal line H4 may have forty-ninth to sixty-fourth pixels P49, P50, . . . P64.

When the first image 21 is stored in the memory device 11 according to the linear map, each of the pixels in the first image 21 may be stored according to an order of the pixels. For example, the memory device 11 may store the first pixel P1, and then may store the second pixel P2 to be adjacent to the first pixel P1. Moreover, the memory device 11 may store the third pixel P3 to be adjacent to the second pixel P2. Likewise, the memory device 11 may store the fourth pixel P4 to be adjacent to the third pixel P3. That is, the memory device 11 may sequentially store each of the first to sixtieth pixels which are included in the first line H1.

The linear map may be an address mapping format that is generally used. For example, when the CPU 16 performs image-processing with respect to image data, the CPU 16 may access the image data without conversion of an address to access the image data.

Figure 2B:
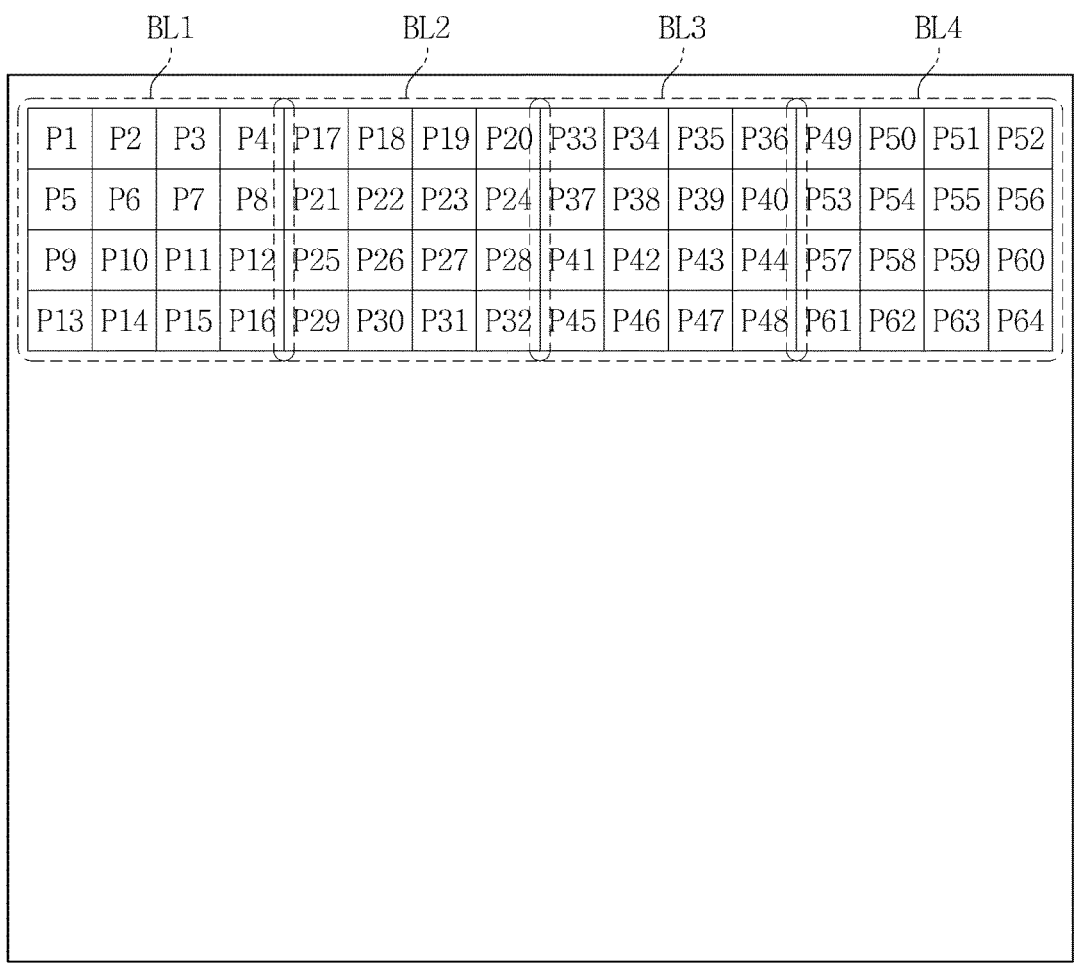
FIG. 2B is a conceptual diagram illustrating pixels for describing a tiled map.

FIG. 2B is a conceptual diagram illustrating pixels for describing a tiled map. Referring to FIGS. 1 and 2B, a second image 22 may be illustrated in FIGS. 1 and 2B. The second image 22 may include a plurality of pixels P1, P2, . . . P64. For example, when the second image 22 has a resolution of 800×600, the second image 22 may have 480,000 pixels.

The first to sixty-fourth pixels P1, P2, . . . P64 in the first image 21 shown in FIG. 2A may have a sequential address. On the other hand, the second image 22 shown in FIG. 2B may include a plurality of blocks (e.g., tiles). Pixels in the second image 22 may be allocated in units of blocks.

For example, the second image 22 may include first to fourth blocks BL1, BL2, BL3, BL4. The first block BL1 may have first to sixteenth pixels P1, P2, . . . P16. The second block BL2 may have seventeenth to thirty-second pixels P17, P18, . . . P32. The third block BL3 may have thirty-third to forty-eighth pixels P33, P34, . . . P48. The fourth block BL4 may have forty-ninth to sixty-fourth pixels P49, P50, . . . P64.

An address of each of the first to sixteenth pixels P1, P2, . . . P16 may be allocated in the block BL1. Then, an address of each of the seventeenth to thirty-second pixels P17, P18, . . . P32 may be allocated in the block BL2. That is, a method for allocating an address according to a tile form is referred to as a tiled map.

The form of a tile may be changed according to a size of a tile. For example, pixels included in the tile having 4×4 in FIG. 2B may have a consecutive address in the tile. However, the tiled map may have a more complex address-mapping format than the linear map because the tiled map requires a process for calculating a position of a corresponding block and for obtaining an address mapped according to the calculated position.

Accordingly, when the CPU 16 performs image-processing, a program to be performed by the CPU 16 may be complex. Here, the AP 10 may store an image according to the tiled map and an image corresponding thereto according to the linear map. Moreover, the AP 10 may selectively use one of the image according to the tiled map and the image according to the linear map.

Figure 3A:
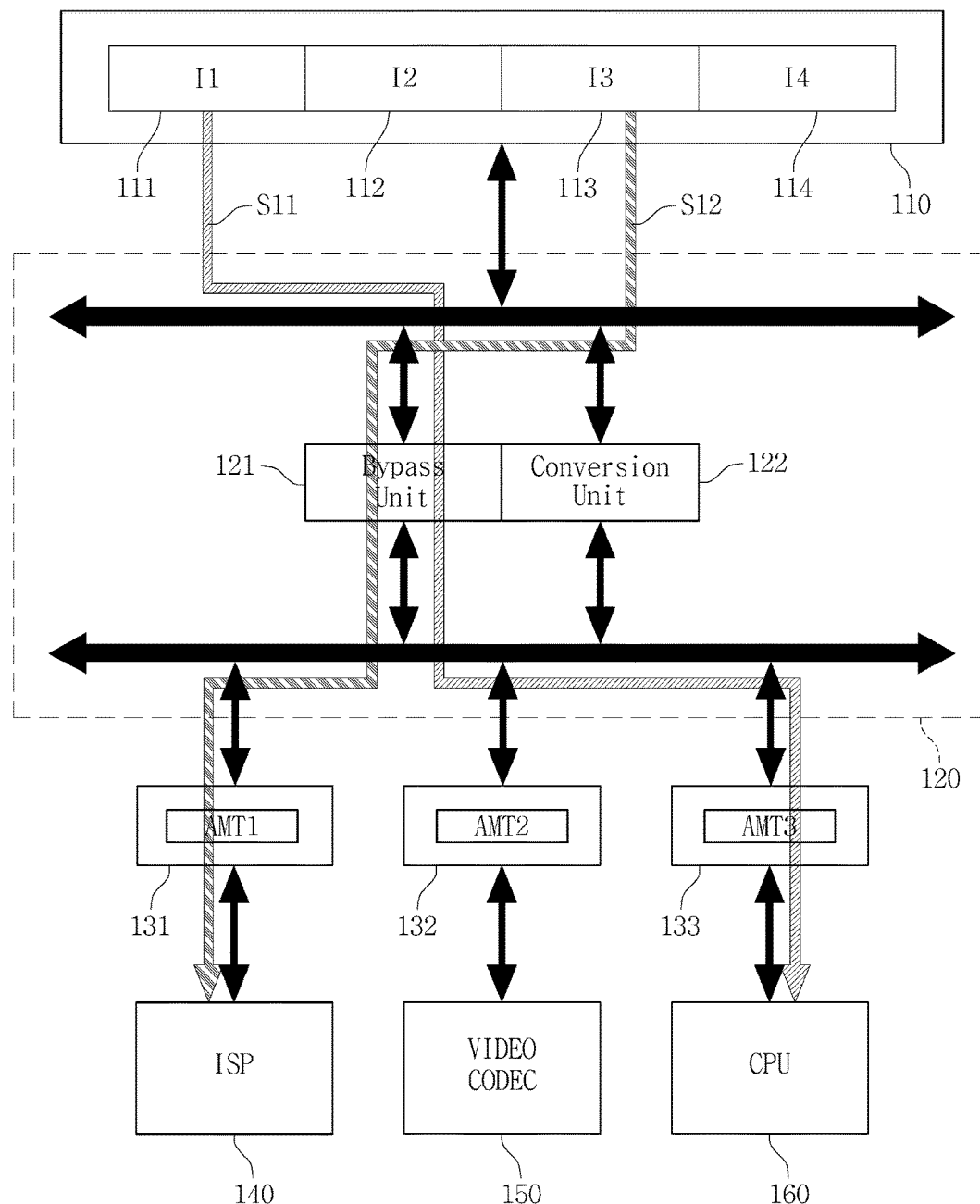
FIG. 3A is a block diagram for describing first and second operations of the AP according to an exemplary embodiment of the inventive concept.

FIG. 3A is a block diagram for describing first and second operations of an AP according to an exemplary embodiment of the inventive concept. Referring to FIG. 3A, the AP 100 according to the exemplary embodiment of the inventive concept may include a memory device 110, a system bus 120, a MMU1 131, a MMU2 132, a MMU3 133, an ISP 140, a video codec 150, and a CPU 160.

The memory device 110 may store data in accordance with multiple address mapping formats. The AP 100 may include at least one address mapping table corresponding to an address mapping formats and/or a stored data, for example, a compressed data. The AP 100 may process a plurality of address mapping formats. For example, the AP 100 may include at least two of a linear map, a tiled map and a compression map. For example, the memory device 11 may store data based upon the linear map or tiled map. Moreover, the memory device 11 may store compressed data.

In an exemplary embodiment, the memory device 110 may be a cache memory device. Moreover, the memory device 110 may be a main memory device such as a Dynamic Random Access Memory (DRAM), a Magnetoresistive Random Access Memory (MRAM) and a Phase Change Random Access Memory (PRAM) located outside the AP 100.

For example, the memory device 110 may store first image data I1 in a first area 111 according to the linear map. Moreover, the memory device 11 may store second image data I2 in a second area 112 according to the tiled map. Moreover, the memory device 110 may compress third image data I3 and store the compressed third image data I3 in a third area 113. Moreover, the memory device 110 may store fourth image data I4 in a fourth area 114 according to the linear map.

One of the master devices such as the CPU, the ISP and the video codec (a data processor) may access one the the first to the fourth areas 111, 112, 113, 114 which may include data stored according to a different address mapping format from the address mapping format of the one of the master devices. In this case, the AP 100 may include a converter which may bypass or convert an address transmitted from the one of the masters to a slave, such as the memory devices.

The system bus 120 may connect the memory device 110 to the ISP 140 through the MMU1 131. The system bus 120 may connect the memory device 110 to the video codec 150 through the MMU2 132. The system bus 120 may connect the memory device 110 to the CPU 160 through the MMU3 133.

The MMU1 131 may include a first address mapping table AMT1 for the ISP 140. The MMU2 132 may include a second address mapping table AMT2 for the video codec 150. The MMU3 may include a third address mapping table AMT3 for the CPU 160.

Each of the first to third address mapping tables AMT1, AMT2, AMT3 may store information on logical addresses, a physical address corresponding to each of the logical addresses, and address mapping format. The third address mapping table AMT3 will be described with reference to FIG. 4.

The ISP 140 may access the memory device 110 based upon the first address mapping table AMT1. The video codec 150 may access the memory device 110 based upon the second address mapping table AMT2. The CPU 160 may access the memory device 110 based upon the third address mapping table AMT3.

The system bus 120 may include a converter which may include a bypass unit 121 and a conversion unit 122. The bypass unit 121 may bypass data stored in the memory device 110. That is, the bypass unit 121 may transmit the data to one of the ISP 140, the video codec 150, and the CPU 160.

The conversion unit 122 may convert data stored in the memory device 110. For example, the conversion unit 122 may convert image data stored according to the tiled map into image data according to the linear map. That is, the conversion unit 122 may convert an address of image data stored according to the tiled map into an address of the image data according to the linear map. Moreover, the conversion unit 122 may decompress compressed data. The conversion unit 122 may transmit the converted or decompressed image data to one of the ISP 140, the video codec 150, and the CPU 160.

For example, when the CPU 160 accesses the first image data I1 stored according to the linear map in the memory device 110, the memory device 110 may transmit the first image data I1 to the CPU 160 through the bypass unit 121.

Moreover, when the CPU 160 accesses the second image data I2 stored according to the tiled map in the memory device 110, the memory device 110 may transmit the second image data I2 to the conversion unit 122. The conversion unit 122 may convert the second image data I2 according to the linear map. The conversion unit 122 may transmit the converted second image data I2 according to the linear map to the CPU 160.

Likewise, when the CPU 160 accesses the third image data I3 which is compressed in the memory device 110, the memory device 110 may transmit the third image data I3 to the conversion unit 122. The conversion unit 122 may decompress the third image data I3. The conversion unit 122 may transmit the third image data I3 that is decompressed to the CPU 160.

The ISP 140 may access the memory device 110 through the system bus 120. For example, the ISP 140 may perform image-processing with respect to the first to fourth image data I1, I2, I3, I4 in the memory device 110 to remove a noise and the like.

When the ISP 140 accesses the third image data I3 which is compressed in the memory device 110, the memory device 110 may transmit the third image data I3 to the conversion unit 122. The conversion unit 122 may decompress the third image data I3. The conversion unit 122 may transmit the third image data I3 that is decompressed to the ISP 140.

The video codec 150 may access the memory device 110 through the system bus 12. For example, the video codec 150 may replay one of the first to fourth image data I1, I2, I3, I4 stored in the memory device 110.

When the video codec 150 accesses the third image data I3, which is compressed in the memory device 110, the memory device 110 may transmit the third image data I3 to the conversion unit 122. The conversion unit 122 may decompress the third image data I3. The conversion unit 122 may transmit the third image data I3 that is decompressed to the video codec 150.

Likewise, the CPU 160 may access the memory device 110 through the system bus 120. The CPU may access image data stored according to the linear map and process the image data. For example, the CPU 160 may edit an image with respect to the first image data I1.

The AP 100 according to an exemplary embodiment of the inventive concept may access data regardless of address mapping format.

For example, the first operation (S11) of the AP 100 is described below. When the CPU 160 reads the first image data I1 in the memory device 110, the CPU 160 may transmit a logical address to the MMU3 133.

The MMU3 133 may convert a logical address into a physical address using the third address mapping table AMT3. Moreover, the MMU3 133 may recognize address mapping format corresponding to the logical address using the third address mapping table AMT3.

The MMU3133 may transmit the converted physical address to the memory device 110 through the system bus 120. When address mapping format corresponding to the logical address is the linear map, the MMU3 133 may control the bypass unit 121 to receive the first image data I1 corresponding to the physical address. The bypass unit 121 may transmit the first image data I1 to the CPU 160. Likewise, each of the ISP 140 and the video codec 150 may access the memory device 110 through the bypass unit 121.

Furthermore, the AP 100 may perform the second operation (S12), which is independent from the first operation (S11). When the ISP 140 reads the third image data I3 in the memory device 110, the ISP 140 may transmit the logical address to the MMU1 131.

The MMU1 131 may convert the logical address into the physical address. Moreover, the MMU1 131 may recognize address mapping format corresponding to the logical address using the first address mapping table AMT1.

The MMU1 131 may transmit the converted physical address to the memory device 110 through the system bus 120. When address mapping format corresponding to the logical address is a compression map, the memory device 110 may transmit the third image data I3 corresponding to the physical address to the bypass unit 121. The bypass unit 121 may transmit the first image data I1 to the ISP 140. Likewise, the video codec 150 may access the memory device 110 through the bypass unit 121.

In an exemplary embodiment, the memory device 110 may be a DRAM installed outside the AP 100. Here, a mobile apparatus according to another exemplary embodiment of the inventive concept may include the memory device 110 for storing data based upon address mapping format, and the AP 100 for receiving the data from the memory device 110.

Figure 3B:
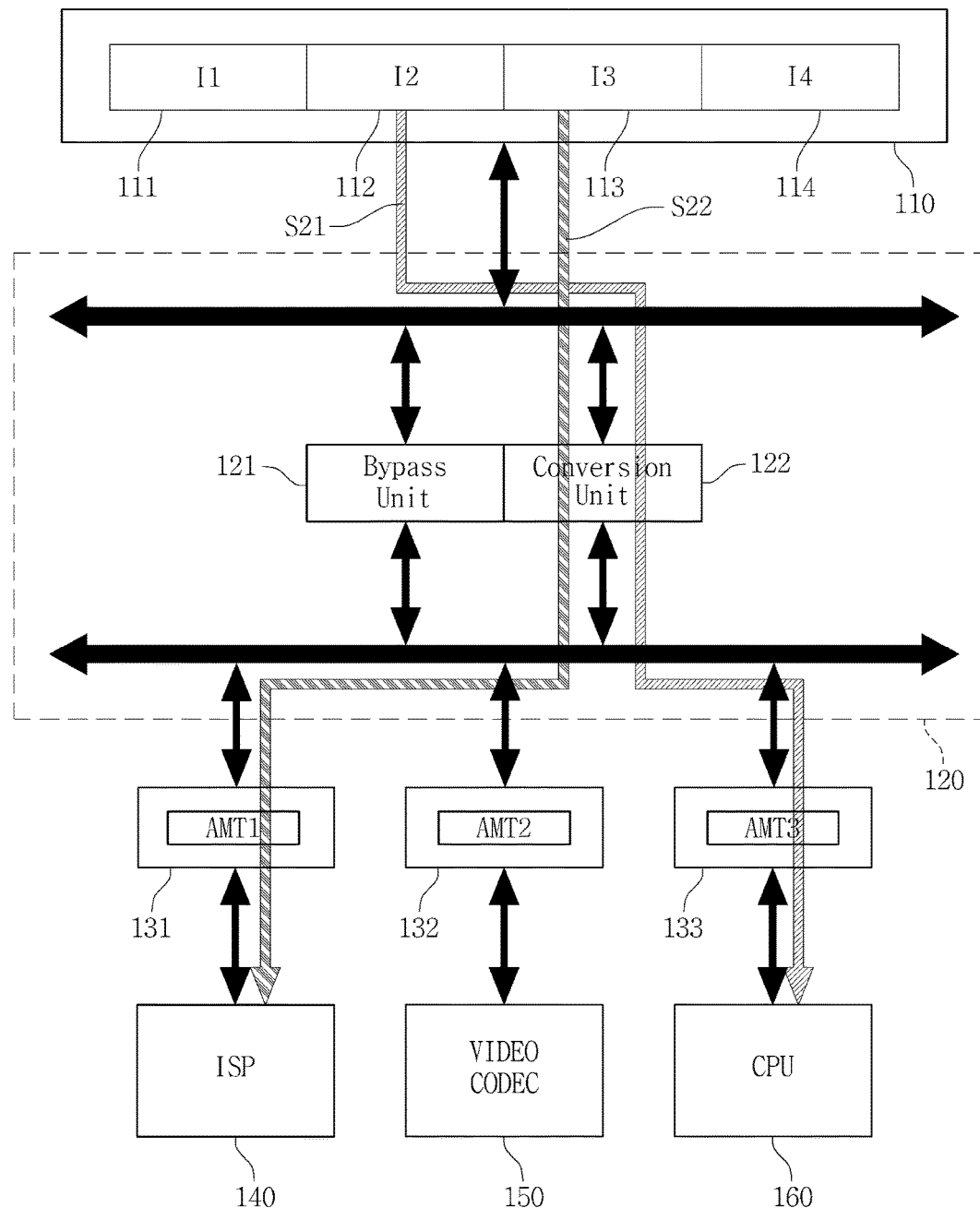
FIG. 3B is a block diagram for describing third and fourth operations of the AP according to the exemplary embodiment of the inventive concept.

FIG. 3B is a block diagram for describing third and fourth operations of the AP according to the exemplary embodiment of the inventive concept. Referring to FIG. 3B, the AP 100 according to the exemplary embodiment of the inventive concept may include a memory device 110, a system bus 120, a MMU1 131, a MMU2 132, a MMU3 133, an ISP 140, a video codec 150, and a CPU 160.

The AP 100 shown in FIG. 3B may include the same configuration as that of the AP 100 shown in FIG. 3A.

When the CPU 160 directly accesses the second image data I2 stored according to the tiled map, the CPU 160 may be unable to perform image-processing with respect to the second image data I2.

Likewise, when the CPU 160 directly accesses the third image data I3 that is compressed, the CPU 160 may be unable to perform image-processing with respect to the third image data I3.

Regarding an address conversion operation, the third operation (S21) of the AP 100 according to an exemplary embodiment of the inventive concept is described below. When the CPU 160 reads the second image data I2 in the memory device 110, the CPU 160 may transmit a logical address to the MMU3 133.

The MMU3 133 may convert a logical address into a physical address using the third address mapping table AMT3. Moreover, the MMU3 133 may recognize an address mapping format corresponding to the logical address using the third address mapping table AMT3.

The MMU3 133 may transmit the converted physical address to the memory device 110 through the system bus 120. When address mapping format corresponding to the logical address is the tiled map, the memory device 110 may transmit the second image data I2 corresponding to a physical address to the conversion unit 122.

The conversion unit 122 may convert the second image data I2 stored according to tiled map based upon the linear map. The conversion unit 122 may transmit the converted second image data I2 to the CPU 160.

Furthermore, the AP 100 may perform the fourth operation (S22) that is independent from the third operation (S21). When the ISP 140 reads the third image data I3 in the memory device 110, the ISP 140 may transmit the logical address to the MMU1 131.

The MMU1 131 may convert the logical address into the physical address using the first address mapping table AMT1. Moreover, the MMU1 131 may recognize address mapping format corresponding to the logical address using the first address mapping table AMT1. Moreover, the ISP 140 may recognize a memory map or a compression state corresponding to the logical address using the first address mapping table AMT1.

The MMU1 131 may transmit the converted physical address to the memory device 110 through the system bus 120. When address mapping format corresponding to the logical address is a compression map, the memory device 110 may transmit the third image data I3 corresponding to the physical address to the conversion unit 122.

The conversion unit 122 may decompress the third image data I3. The conversion unit 122 may transmit the third image data I3 that is decompressed to the ISP 140. Likewise, the video codec 150 may access the memory device 110 through the conversion unit 122.

FIG. 4 is a table illustrating an address mapping table shown in FIGS. 3A and 3B. Referring to FIGS. 3A and 4, the MMU3 133 may include the third address mapping table AMT3.

As described in FIGS. 2A through 3B, one of the master devices, for example, the CPU 160, may operate (read or write) in association with a plurality of address mapping formats. The AP 100 may include a master device related to the plurality of address mapping formats. Thus, The AP 100 may include an address mapping table which includes mapping information associated with the plurality of address mapping formats. The address mapping table may be located in the bus system 120 shown in FIG. 3B or be located in a memory controller 215 shown FIG. 5A, but not limited thereto. The address mapping table may be located between a memory controller and a bus system or be located anywhere between a master device and a slave device. The third address mapping table AMT3 according to the exemplary embodiment of the inventive concept may include information on logical addresses, a physical address corresponding to each of the logical addresses, and address mapping formats corresponding to each of the logical addresses.

For example, the third address mapping table AMT3 may include first to fourth logical addresses LA1, LA2, LA3, LA4. Moreover, the third address mapping table AMT3 may include first to fourth physical addresses PA1, PA2, PA3, PA4. Furthermore, the third address mapping table AMT3 may include first to fourth address mapping formats M1, M2, M3, M4. The address mapping format may include a memory map or a compression map.

An address mapping table may be divided into a plurality of address mapping tables which correspond to different address mapping formats or correspond to different areas in a memory device, respectively, as shown in FIG. 4.

The first address mapping format M1 may be a linear map. The second address mapping format M2 may be a tiled map. The third address mapping format M3 may be a compression map. The fourth address mapping format M4 may be another linear map.

Furthermore, each of the first address mapping table AMT1 and the second address mapping table AMT2 may include the same configuration as that of the third address mapping table AMT3.

Figure 5A:
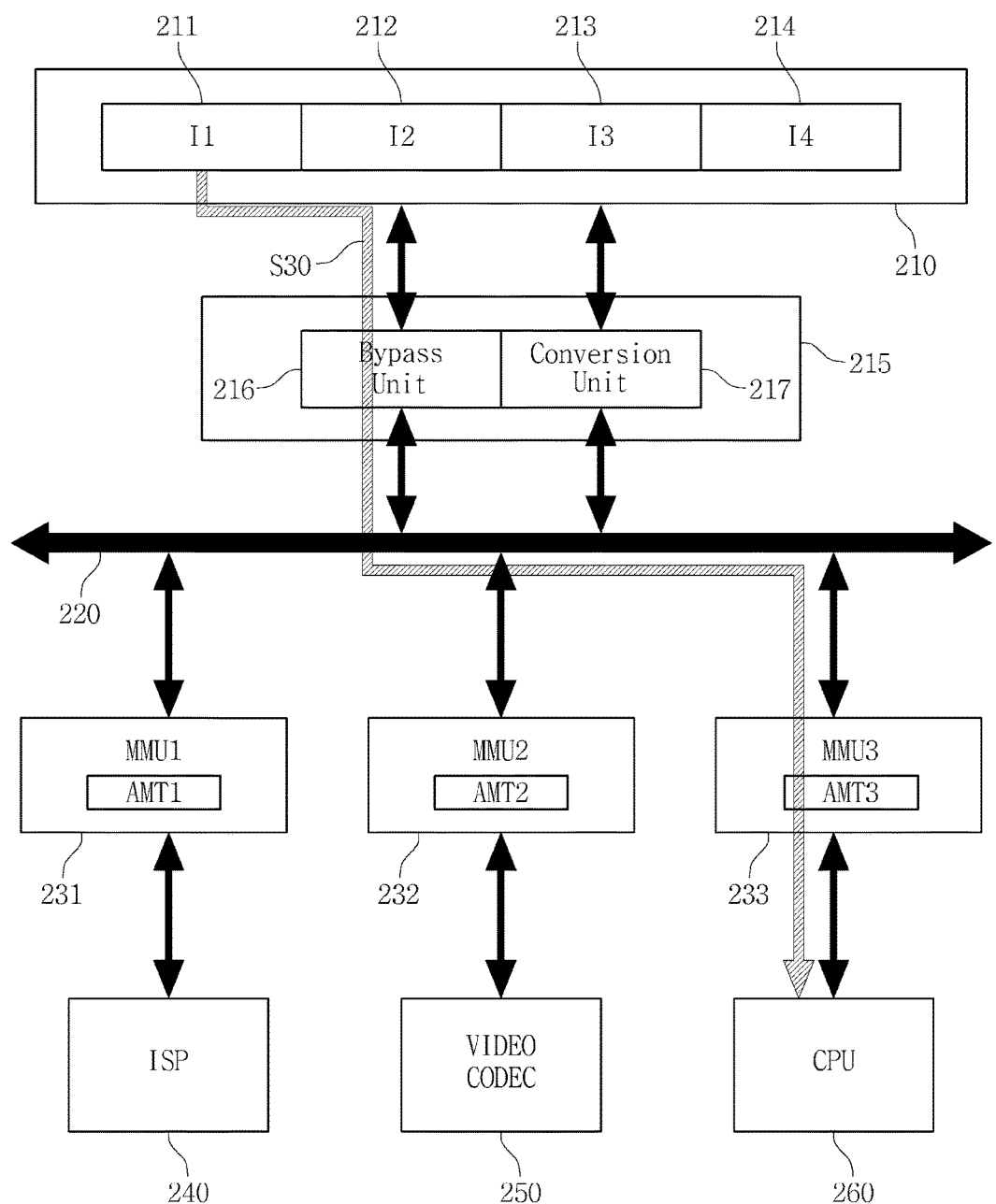
FIG. 5A is a block diagram for describing a first operation of an AP according to another exemplary embodiment of the inventive concept.

FIG. 5A is a block diagram for describing a first operation of the AP according to another exemplary embodiment of the inventive concept. Referring to FIG. 5A, the AP 200 according to another exemplary embodiment of the inventive concept may include a memory device 210, a memory controller 215, a system bus 220, a MMU1 231, a MMU2 232, a MMU3 233, an ISP 240, a video codec 250, and a CPU 260.

The memory device 210 may store data in accordance with multiple address mapping formats. The AP 200 may include at least one address mapping table corresponding to an address mapping format and/or a stored data, for example, a compressed data. The AP 200 may process a plurality of address mapping formats. For example, the AP 200 may include at least two of a linear map, a tiled map and a compression map. For example, the memory device 210 may store data based upon the linear map or tiled map. Moreover, the memory device 210 may store compressed data.

In an exemplary embodiment, the memory device 210 may be a cache memory device. Moreover, the memory device 210 may be a main memory device such as a Dynamic Random Access Memory (DRAM), a Magnetoresistive Random Access Memory (MRAM) and a Phase Change Random Access Memory (PRAM) located outside the AP 200.

For example, the memory device 210 may store first image data I1 in a first area 211 according to the linear map. Moreover, the memory device 210 may store second image data I2 in a second area 212 according to the tiled map. Moreover, the memory device 210 may compress third image data I3 and store the compressed third image data I3 in a third area 213. Moreover, the memory device 1200 may store fourth image data I4 in a fourth area 214 according to the linear map.

One of the master devices such the CPU, the ISP and the video codec (a data processor) may access one the first to the fourth areas 211, 212, 213, 214 which may include data stored according to a different address mapping format from the address mapping format of the one of the master devices. In this case, the AP 200 may include a converter which may bypass or convert an address transmitted from the one of the masters to a slave such as the memory devices.

The system bus 220 may connect the memory device 210 to the ISP 240 through the MMU1 231. The system bus 220 may connect the memory device 210 to the video codec 250 through the MMU2 232. The system bus 220 may connect the memory device 210 to the CPU 260 through the MMU3 233.

The MMU1 231 may include a first address mapping table AMT1 for the ISP 240. The MMU2 232 may include a second address mapping table AMT2 for the video codec 250. The MMU3 233 may include a third address mapping table AMT3 for the CPU 260.

Each of the first to third address mapping tables AMT1, AMT2, AMT3 may store information on logical addresses, a physical address corresponding to each of the logical addresses, and address mapping format.

The ISP 240 may access the memory device 210 based upon the first address mapping table AMT1. The video codec 250 may access the memory device 210 based upon the second address mapping table AMT2. The CPU 260 may access the memory device 210 based upon the third address mapping table AMT3.

The memory controller 215 may control the memory device 210. Moreover, the memory controller 215 may include a converter which may include a bypass unit 216 and a conversion unit 217. The bypass unit 216 may bypass data stored in the memory device 210. The conversion unit 217 may change data stored in the memory device 210. The conversion unit 217 may change image data based upon address mapping format.

The ISP 240 may access the memory device 210 through the system bus 220. For example, the ISP 240 may perform image-processing with respect to the first to fourth image data I1 to I4 in the memory device 210 to remove a noise and the like.

The video codec 250 may access the memory device 210 through the system bus 220. For example, the video codec 250 may replay one of the first to fourth image data I1 to I4 stored in the memory device 210.

For example, the first operation (S30) of the AP 200 is described below. When the CPU 260 reads the first image data I1 in the memory device 210, the CPU 260 may transmit a logical address to the MMU3 233.

The MMU3 233 may convert a logical address into a physical address using the third address mapping table AMT3. Moreover, the MMU3 233 may recognize address mapping format corresponding to the logical address using the third address mapping table AMT3.

The MMU3 233 may transmit the converted physical address to the memory device 210 through the system bus 220. When address mapping format corresponding to the logical address is the linear map, the memory device 210 may transmit the first image data I1 corresponding to a physical address to the bypass unit 216. The bypass unit 216 may transmit the first image data I1 to the CPU 260.

Figure 5B:
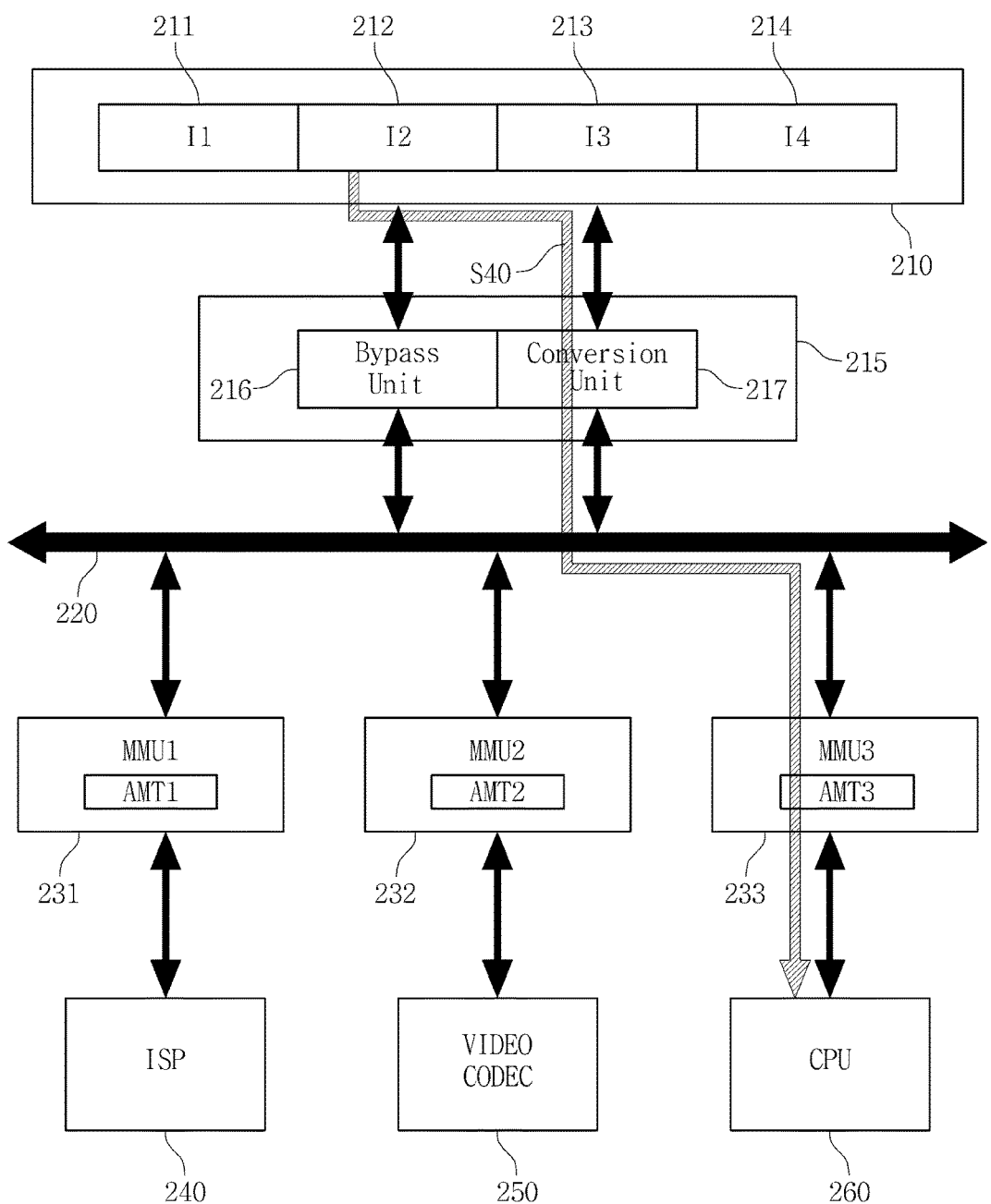
FIG. 5B is a block diagram for describing a second operation of the AP according to another exemplary embodiment of the inventive concept.

FIG. 5B is a block diagram for describing a second operation of the AP according to another exemplary embodiment of the inventive concept. Referring to FIG. 5B, the AP 200 according to the another exemplary embodiment of the inventive concept may include a memory device 210, a memory controller 215, a system bus 220, a MMU1 231, a MMU2 232, a MMU3 233, an ISP 240, a video codec 250, and a CPU 260.

The AP 200 shown in FIG. 5B may include the same configuration as that of the AP 200 shown in FIG. 5A.

When the CPU 260 directly accesses the second image data I2 stored according to the tiled map, the CPU 260 may not perform image-processing with respect to the second image data I2.

Likewise, when the CPU 260 directly accesses the third image data I3 that is compressed, the CPU 260 may not perform image-processing with respect to the third image data I3.

Regarding an address conversion operation, the second operation (S40) of the AP 200 according to another exemplary embodiment of the inventive concept is described below. When the CPU 260 reads the second image data I2 in the memory device 210, the CPU 260 may transmit a logical address to the MMU3 233.

The MMU3 233 may convert a logical address into a physical address using the third address mapping table AMT3. Moreover, the MMU3 233 may recognize address mapping format corresponding to the logical address using the third address mapping table AMT3.

The MMU3 233 may transmit the converted physical address to the memory device 210 through the system bus 220. When address mapping format corresponding to the logical address is the tiled map, the memory device 210 may transmit the second image data I2 corresponding to a physical address to the conversion unit 217.

The conversion unit 217 may convert the second image data I2 stored according to tiled map based upon the linear map. The conversion unit 217 may transmit the converted second image data I2 to the CPU 260.

Figure 6:
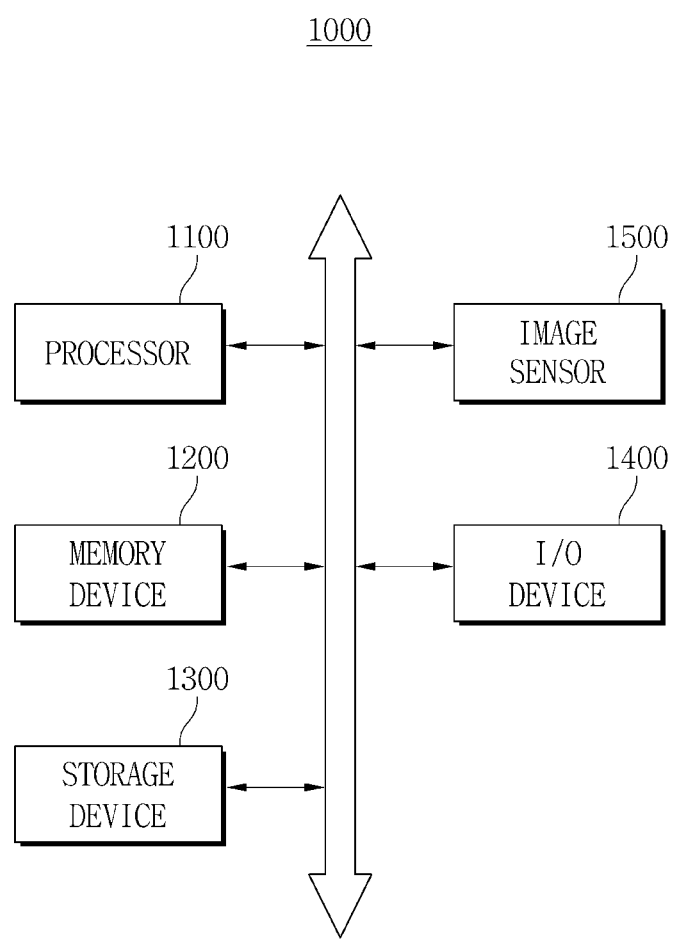
FIG. 6 is a block diagram illustrating a mobile apparatus including the AP shown in FIG. 3A.

FIG. 6 is a block diagram illustrating a mobile apparatus including the AP shown in FIG. 3A. Referring to FIG. 6, the mobile apparatus 1000 may include a digital camera, a mobile phone, personal digital assistants, a portable multimedia player, a smart phone, etc.

For example, the mobile apparatus 1000 may include a processor 1100, a memory device 1200, a storage device 1300, an input/output device 1400, and an image sensor 1500.

The processor 1100 may perform specific calculations or tasks. In one exemplary embodiment, the processor 1100 may include a microprocessor, a CPU, and an AP. The processor 1100 may communicate with the memory device 1200, the storage device 1300, and the input/output device 1400 through an address bus, a control bus, and a data bus.

In an exemplary embodiment, the processor 1100 may include the AP 100 shown in FIG. 3A.

The memory device 1200 may store data which is needed for an operation of the mobile apparatus 1000. For example, the memory device 1200 may be embodied in a DRAM, a mobile DRAM, a static random access memory (SRAM), a phase change RAM (PRAM), a ferroelectric RAM (FRAM), a resistive RAM (RRAM) and/or a magnetic RAM (MRAM), etc.

The storage device 1300 may include a solid state drive (SSD), a hard disk drive (HDD), a CD-ROM, and the like.

The input/output device 1400 may include input units such as a keyboard, a keypad, a mouse and output units such as a printer, display, etc.

The image sensor 1500 may communication with the processor 1100 through the bus or other communication links.

A mobile apparatus 1000 according to the exemplary embodiment of the inventive concept may include an AP 100 or 200 shown in FIG. 3A or FIG. 5A. In one exemplary embodiment, the mobile apparatus 1000 may include a memory device for storing image data based upon address mapping format and an AP for receiving the image data from the memory device.

The AP may include a memory management unit including an address mapping table storing information on a logical address, a physical address, and address mapping format, which are with respect to the image data, a system bus for converting the image data according to the address mapping format or bypassing the image data, and a CPU for accessing the image data based upon the address mapping table through the system bus.

Figure 7:
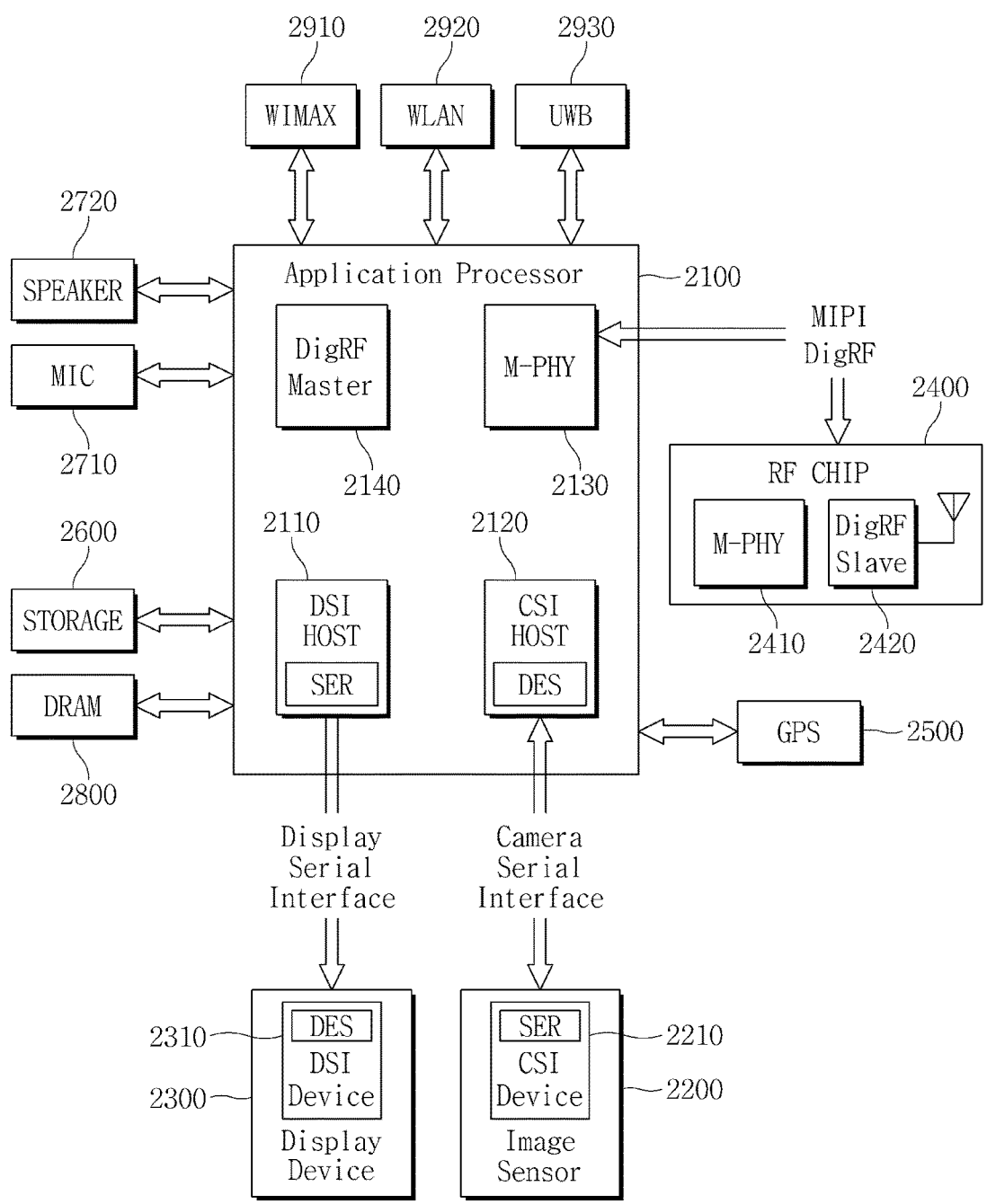
FIG. 7 is a block diagram illustrating an exemplary embodiment of an interface which is used in the AP shown in FIG. 6.

FIG. 7 is a block diagram illustrating an exemplary embodiment of an interface which is used in the AP shown in FIG. 6. Referring to FIG. 7, a computer system 2000 may be embodied in a data processing device which is capable of supporting a MIPI interface, and include an AP 2110, an image sensor 2200, and a display device 2300, etc.

A camera serial interface (CSI) host 2120 in the AP may perform a serial communication with a CSI device 2210 in the image sensor 2200 through a CSI. In one exemplary embodiment, the AP 2100 may include the application processor 100 shown in FIG. 3A.

In one exemplary embodiment, the CSI host 2120 may include a deserializer (DES), and the CSI device 341 may include a serializer (SER).

A display serial interface (DSI) host 2110 in the AP 2100 may perform a serial communication with a DSI device 2310 in the display device 2300 through a DSI.

The computing system 2000 may further include a radio frequency (RF) chip 2400 which communicates with the AP 2100. An M-PHY 2130 in the AP 2100 and a M-PHY 2410 in the RF chip 2400 may perform data transceiving according to a MIPI DigRF. Further, the AP 2100 may further include a DigRF MASTER 2140 which controls data transceiving according to the MIPI DigRF.

The computing system 2000 may include a global positioning system (GPS) 2500, a storage 2600, a microphone 2710, a speaker 2720, and a DRAM 2800.

Further, the computing system 2000 may communicate with other devices using a Worldwide Interoperability for Microwave Access (WiMAX) 2910, a wireless local area network (WLAN) 2920, and an ultra-wideband (UWB) 2930.

The AP according to the exemplary embodiment of the inventive concept may access data stored in a memory device without a specific management of address mapping format.

Therefore, the AP may access the memory device regardless of address mapping format.

The inventive concept may be applied to an AP and a mobile apparatus having the same.

With reference to FIGS. 2A through 7, a method of accessing data having a plurality of address mapping formats may include receiving a first address to access the data stored according to a plurality of address mapping formats from a master device, generating a second address based upon the first address and one of the address mapping formats associated with the first address, transmitting the second address to access the data to a slave device. The method of accessing data may further include determining whether the first address is associated with a compression map. The method of accessing data may further include decompressing the data when the address map associated with the first address is compression map. Here, the data may be stored in a memory device in an application processor or outside of the application processor.

Although a few exemplary embodiments have been described, those skilled in the art will readily appreciate that many modifications are possible without materially departing from the novel teachings and advantages. Accordingly, all such modifications are intended to be included within the scope of this inventive concept as defined in the claims.

What is claimed is:
1. An application processor comprising:
a memory device configured to store data based upon a plurality of address mapping formats;
a memory management unit comprising an address mapping table configured to store information in one of the address mapping formats to access the data;
a system bus configured to generate a second address based upon a first address to access the data and the address mapping table; and
a data processing device configured to receive the data according to the second address through the system bus,
wherein the system bus comprises:
a converter comprising:
a conversion unit configured to convert the first address and/or the data based upon the address mapping format; and
a bypass unit configured to bypass the first address and/or the data,
wherein when the address mapping format is a linear map, the bypass unit outputs the first address as the second address, and when the address mapping format is a tiled map, the conversion unit converts the first address into a converted address based on the linear map and outputs the converted address as the second address, wherein the system bus is configured to connect the memory device to the data processing device through the memory management unit.

2. The application processor of claim 1, wherein the data processing device transceives the data through one of the conversion unit and the bypass unit based upon the address mapping table.

3. The application processor of claim 1, wherein when the address mapping format is a compression map, the conversion unit decompresses the data.

4. The application processor of claim 1, wherein the address mapping table stores information on a logical address, a physical address, and address mapping format with respect to an area where the data is stored in the memory device.

5. The application processor of claim 1, wherein the converter further comprises an address mapping table to convert the first address to the second address.

6. The application processor of claim 1, wherein the data processing device comprises one of an image signal processor, a video codec, and a central processing unit.

7. A mobile apparatus comprising:
a memory device configured to store data based upon an address mapping format;
a memory controller configured to generate a second address based upon a first address to access the data and the address mapping table;
a memory management unit comprising an address mapping table configured to store information in the address mapping format of the data; and
a data processing device configured to receive the data according to the second address;
wherein the memory controller comprises:
a converter comprising:
a conversion unit configured to convert the first address and/or the data based upon the address mapping format; and
bypass unit configured to bypass the first address and/or the data,
wherein when the address mapping format is a linear map, the bypass unit outputs the first address as the second address, and when the address mapping format is a tiled map, the conversion unit converts the first address into a converted address based on the linear map and outputs the converted address as the second address,
wherein the memory controller is configured to connect the memory device to the data processing device through the memory management unit.

8. The mobile apparatus of claim 7, wherein the data processing device transceives the data through one of the conversion unit and the bypass unit based upon the address mapping table.

9. The mobile apparatus of claim 7, wherein when the address mapping format is a compression map, the conversion unit decompresses the data.

10. The mobile apparatus of claim 7, wherein the address mapping table stores information on a logical address, a physical address, and address mapping format with respect to an area where the data is stored in the memory device.

11. The mobile apparatus of claim 7, wherein the converter further comprises an address mapping table to convert the first address to the second address.

12. A method of accessing data comprising:
receiving a first address to access data stored according to a plurality of address mapping formats from a master device;
generating a second address based upon the first address and one of the address mapping formats associated with the first address; and
transmitting the second address to access the data to a slave device,
wherein the first address is transmitted to the slave device as the second address when the address mapping format associated with the first address is a linear map, and the first address is converted into a converted address based on the linear map and the converted address is transmitted to the slave device as the second address when the address mapping format associated with the first address is a tiled map.

13. The method of accessing data of claim 12, further comprising:
determining which one of the plurality of address mapping formats the first address is associated with.

14. The method of accessing data of claim 13, further comprising:
decompressing the data when the address map format associated with the first address is a compression map.

15. The method of accessing data of claim 12, further comprising:
generating the second address by bypassing the first address when the first address is associated with the linear map.

16. The method of accessing data of claim 12, further comprising:
generating the second address by converting the first address based upon a mapping table when the first address is associated with the tiled map or a compression map.

* * * * *